US012594671B2

(12) United States Patent
Gannon et al.

(10) Patent No.: US 12,594,671 B2
(45) Date of Patent: Apr. 7, 2026

(54) TELEOPERATION SYSTEM FOR ROBOTIC MANIPULATION, AND METHODS, APPARATUS, AND SYSTEMS THEREOF

(71) Applicant: Watney Robotics Inc., San Francisco, CA (US)

(72) Inventors: Ryan Gannon, Berkeley, CA (US); Sean Cheong, Berkeley, CA (US)

(73) Assignee: Watney Robotics Inc., San Francisco, CA (US)

( * ) Notice: Subject to any disclaimer, the term of this patent is extended or adjusted under 35 U.S.C. 154(b) by 0 days.

(21) Appl. No.: 19/185,186

(22) Filed: Apr. 21, 2025

(65) Prior Publication Data

US 2025/0326123 A1     Oct. 23, 2025

Related U.S. Application Data

(60) Provisional application No. 63/636,693, filed on Apr. 19, 2024.

(51) Int. Cl.
B25J 9/16          (2006.01)
B25J 17/00         (2006.01)

(52) U.S. Cl.
CPC ........... B25J 9/1689 (2013.01); B25J 9/1692 (2013.01); B25J 17/00 (2013.01)

(58) Field of Classification Search
CPC ........ B25J 9/1689; B25J 9/1692; B25J 17/00; B25J 13/025
See application file for complete search history.

(56) References Cited

U.S. PATENT DOCUMENTS 6,711,468 B2 *   3/2004   Bottero ................... B25J 9/161
                                                    318/568.15
8,639,386 B2 *   1/2014   Summer ................ B25J 9/1689
                                                    701/2

(Continued)

FOREIGN PATENT DOCUMENTS

EP          3465362 B1      4/2019
EP          3845346 A1      7/2021
WO       2025222214 A1     10/2025

OTHER PUBLICATIONS

International Application Serial No. PCT/US25/25657, Search Report and Written Opinion mailed Sep. 9, 2025.

*Primary Examiner* — Robert T Nguyen
(74) *Attorney, Agent, or Firm* — Polygon IP, LLP

(57)          ABSTRACT
A teleoperation system, including a robotic controller configured to translate a plurality of user inputs to a plurality of robotic control signals. A robotic manipulator, configured to operate separately from the robotic controller and to receive robotic control signals from the robotic controller, the robotic manipulator comprising a plurality of first joints and an end effector, wherein the robotic manipulator is configured to assume a plurality of poses, and wherein each respective pose of the plurality of poses corresponds to a respective configuration of the plurality of first joints. A feedback system, operatively coupled to the robotic manipulator, the feedback system configured to generate feedback information and transmit the feedback information to the robotic controller, wherein the feedback information includes information that indicates a current pose of the robotic manipulator, including the respective configuration of the plurality of first joints corresponding to the current pose of the robotic manipulator.

20 Claims, 11 Drawing Sheets

(56) References Cited

U.S. PATENT DOCUMENTS

| | | | | | |
|---|---|---|---|---|---|
| 9,579,797 | B2 * | 2/2017 | Apkarian | ............... | B25J 9/1689 |
| 9,789,612 | B2 * | 10/2017 | Hoffman | .................. | B25J 19/04 |
| 11,679,499 | B2 * | 6/2023 | Rabindran | ............ | B25J 9/1653 |
| | | | | | 700/245 |
| 11,697,209 | B1 * | 7/2023 | Mourlam | .............. | B66F 11/046 |
| | | | | | 700/255 |
| 11,992,282 | B2 * | 5/2024 | Denlinger | .............. | A61B 34/37 |
| 12,161,432 | B2 * | 12/2024 | Noonan | ................. | A61B 90/50 |
| 2014/0171964 | A1 * | 6/2014 | Yang | ...................... | A61B 34/37 |
| | | | | | 606/130 |
| 2017/0322629 | A1 | 11/2017 | Pirasmepulkul et al. | | |
| 2021/0205986 | A1 | 7/2021 | Kalouche | | |
| 2023/0226686 | A1 * | 7/2023 | Yamamoto | ................. | B25J 3/04 |
| 2024/0416504 | A1 * | 12/2024 | Beard, III | ................ | B25J 13/08 |

* cited by examiner

Server(s) 200

Memory 206

Operating System 210

Network Communication Module 212

Server-Side Module 214

Data Receiving Module 2140

Data Processing Module 2142

Video Processing Module 2144

Calibration Module 2146

Watchdog Module 2148

Quality Control Module 2150

Adaptive Feedback Module 2152

Server Database 216

Input Records 2160

Pose Information 2162

Timestamps 2164

CPU(s) 202

208

Network Interface(s) 204

>Move joystick to Robot
>Move to Calculation Base and Squeeze Both XXX.
>Joystick Device is Openned.
>Joystick Rebooting...
>Normal MSG Test.
>Warn MSG Test.
>Error MSG Test.

Robotic Controller 600

Communications Module 606

Transmitter 6060

Receiver 6062

CPU(s) 602

Memory 608

Operating Logic 620

Communication Module 622

Input Processing Module 626

User Interface Module 628

Feedback Module 630

User Interface 604

Display(s) 6040

Input Devices 6042

Joints 6044

Joystick(s) 6046

Trigger(s) 6048

Haptic Interface 6050

Robotic Manipulator 700

CPU(s)
702

Communications
Module 742

Transmitter 7420

Receiver 7422

Memory 706

Operating Logic 720

Communication Module 722

Input Processing Module 724

Feedback Module 726

Status Information 728

Sensor(s) 790

Image/Video
Capture
Device 718

800

802 At a robotic controller

804 Receive a plurality of user inputs

806 Translate the plurality of user inputs to a plurality of robotic control signals

808 Transmits the plurality of robotic control signals from the robotic controller to a robotic manipulator that is configured to operate separately from the robotic controller, wherein the plurality of robotic control signals, when received by the robotic manipulator, cause the manipulator to move a plurality of first joints and an end effector of the robotic manipulator in accordance with the received plurality of robotic control signals

810 Receive, from a feedback system operatively coupled to the robotic manipulator, feedback information that includes a current pose of the robotic manipulator and includes a current configuration of the plurality of first joints

FIG. 8

 900

902 At a robotic controller that includes a plurality of first joints, the plurality of first joints corresponding to a plurality of second joints of a robotic manipulator that is in communication with the robotic controller 904 Receive a plurality of user inputs manipulating the plurality of first joints of the robotic controller while the robotic controller is operating in a calibration mode 906 Transmit controller pose information to a robotic manipulator in communication with the robotic controller, wherein the controller pose information is based on a current pose of the plurality of first joints of the robotic controller in response to receiving the plurality of user inputs manipulating the plurality of first joints of the robotic controller 908 Receive feedback information from the robotic controller, wherein the feedback information includes information corresponding to a pose of the plurality of second joints of the robotic manipulator 910 Generate haptic feedback based on an amount by which the current pose of the plurality of first joints differs from the pose of the plurality of second joints of the robotic manipulator in accordance with a determination that the current pose of the plurality of first joints is different than the pose of the plurality of second joints of the robotic manipulator 912 Switch the robotic controller to operate in a control mode in accordance with a determination that the current pose of the plurality of first joints is the same as the pose of the plurality of second joints of the robotic manipulator

FIG. 9

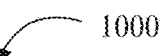
1000

| 1002 Transmit, via a device comprising a processor, a plurality of robotic signals |
|---|

| 1004 Receive, at a robotic manipulator, the plurality of robotic control signals |
|---|

| 1006 Change a pose and/or position of the robotic manipulator in accordance with the robotic control signals |
|---|

| 1008 Detect an interrupt event while changing the pose and/or position of the robotic manipulator in accordance with the robotic control signals |
|---|

| 1010 Determine a modified set of instructions for changing the pose and/or position of the robotic manipulator in accordance with a control algorithm, wherein the control algorithm calculates an actual time interval between received signals of the robotic control signals in response to detecting the interrupt event |
|---|

FIG. 10

TELEOPERATION SYSTEM FOR ROBOTIC MANIPULATION, AND METHODS, APPARATUS, AND SYSTEMS THEREOF

This application claims priority to U.S. Provisional Application No. 63/636,693, entitled "Teleoperation System for Robotic Manipulation and Methods, Apparatus, and System Thereof" filed Apr. 19, 2024, which is hereby incorporated by reference in its entirety.

TECHNICAL FIELD

This disclosure relates generally to a teleoperation system, and more specifically to a teleoperation system that includes the remote teleoperation of a robotic manipulator (e.g., a robot arm) in response to external control signals issued by a remote operator using a haptic controller (e.g., a joystick) at a distance from the robotic manipulator.

BACKGROUND

Improvements to teleoperation systems and methods for the remote control of robotics have increased significantly in recent years. These systems may apply integration of a remote haptic interfaces to assist in the remote control the robot. Current examples that utilize remote haptic interfaces require operators to be seated at the same table or room as the robot.

SUMMARY

Accordingly, there is a need for systems and methods for low latency teleoperation of remote manipulators. Such systems and methods optionally complement or replace conventional methods for low latency teleoperation of remote manipulators.

In accordance with some embodiments, a teleoperation system is disclosed. The teleoperation system includes a robotic controller configured to translate a plurality of user inputs to a plurality of robotic control signals. The teleoperation system further includes a robotic manipulator which is configured to operate separately from the robotic controller and to receive robotic control signals from the robotic controller. The robotic manipulator comprises a plurality of first joints and an end effector. The robotic manipulator is configured to assume a plurality of poses, and wherein each respective pose of the plurality of poses corresponds to a respective configuration of the plurality of first joints. The teleoperation system further includes a feedback system, operatively coupled to the robotic manipulator. The feedback system is configured to generate feedback information and transmit the feedback information to the robotic controller. The feedback information includes information that indicates a current pose of the robotic manipulator, including the respective configuration of the plurality of first joints corresponding to the current pose of the robotic manipulator.

In accordance with some embodiments, a method is performed at a robotic controller. The method includes receiving a plurality of user inputs at a and translating the plurality of user inputs to a plurality of robotic control signals. The method further includes transmitting the plurality of robotic control signals from the robotic controller to a robotic manipulator that is configured to operate separately from the robotic controller, wherein the plurality of robotic control signals, when received by the robotic manipulator, cause the manipulator to move a plurality of first joints and an end effector of the robotic manipulator in accordance with the received plurality of robotic control signals. The method further includes receiving, from a feedback system operatively coupled to the robotic manipulator, feedback information that includes a current pose of the robotic manipulator and includes a current configuration of the plurality of first joints.

In accordance with some embodiments, a method is performed at a robotic controller. The robotic controller includes a plurality of first joints, the plurality of first joints corresponding to a plurality of second joints of a robotic manipulator that is in communication with the robotic controller. The method includes receiving a plurality of user inputs manipulating the plurality of first joints of the robotic controller while the robotic controller is operating in a calibration mode. The method further includes transmitting controller pose information to a robotic manipulator in communication with the robotic controller, wherein the controller pose information is based on a current pose of the plurality of first joints of the robotic controller in response to receiving the plurality of user inputs manipulating the plurality of first joints of the robotic controller. The method further includes receiving feedback information from the robotic controller, wherein the feedback information includes information corresponding to a pose of the plurality of second joints of the robotic manipulator. The method further includes generating haptic feedback based on an amount by which the current pose of the plurality of first joints differs from the pose of the plurality of second joints of the robotic manipulator and switching the robotic controller to operate in a control mode in accordance with a determination that the current pose of the plurality of first joints is different or the same as the pose of the plurality of second joints of the robotic manipulator, respectively.

In accordance with some embodiments, a method is performed. The method includes transmitting, via a device comprising a processor, a plurality of robotic signals, receiving, at a robotic manipulator, the plurality of robotic control signals and changing a pose and/or position of the robotic manipulator in accordance with the robotic control signals. The method further includes detecting an interrupt event while changing the pose and/or position of the robotic manipulator in accordance with the robotic control signals, and determining a modified set of instructions for changing the pose and/or position of the robotic manipulator in accordance with a control algorithm, wherein the control algorithm calculates an actual time interval between received signals of the robotic control signals in response to detecting the interrupt event.

Thus, computing systems are provided with more efficient methods for operating low latency teleoperation of remote manipulators, thereby allowing for near-zero perceived latency between the use of the remote controller and the robotic manipulators, therefore increasing the effectiveness, efficiency, and user satisfaction Such methods may complement or replace conventional methods for operating low latency teleoperation of remote manipulators.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8-10 are a flow diagrams illustrating a representative server system, in accordance with some embodiments.

DESCRIPTION OF EMBODIMENTS

Figure 1:
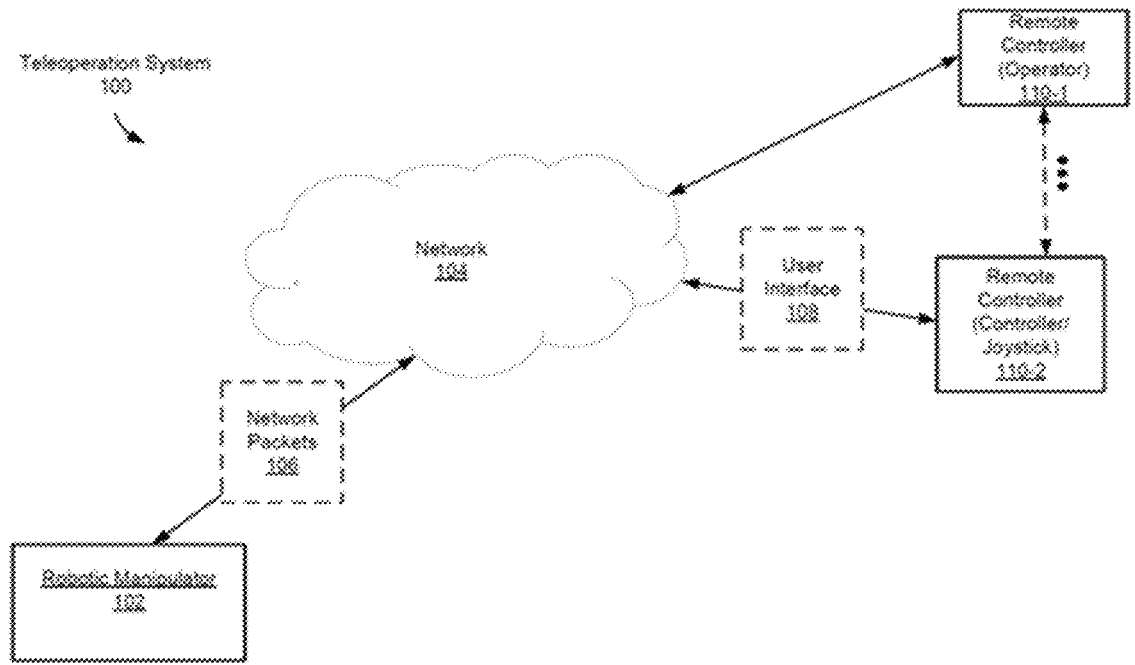
FIG. 1 is a block diagram illustrating a teleoperation system 100 in accordance with some embodiments.

The present disclosure relates to the remote teleoperation of robotics, in accordance with some embodiments. The systems and methods described herein improve teleoperation of robotics in multiple ways. In the disclosed embodiments, the systems and methods are provided for efficiently and intuitively remotely operating a robotic manipulator (e.g., a robot arm) from a location that can be at a distance from the robotic manipulator.

This description of the example embodiments is intended to be read in connection with the accompanying drawings that are to be considered part of the entire written description. Terms concerning data connections, coupling and the like, such as "connected," "interconnected," and/or "in signal communication with" refer to a relationship wherein systems or elements are electrically connected (e.g., wired, wireless) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these example embodiments in connection with the accompanying drawings.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be appreciated that "haptic interfaces" may refer to interfaces that use the sense of touch to provide feedback to users. In some examples, the interfaces employ vibrations, forces, or other tactile sensations to enhance interaction with electronic devices.

In some embodiments, systems, and methods for implementing teleoperation of robotic manipulation include one or more trained or tuned models. The models may include one or more deep reinforcement learning (DRL) algorithms, neural networks, and meta-learning to generate an initial output. In some embodiments, DRL algorithms may include deep deterministic policy gradient (DDPG), proximinal policy optimization (PPO), and soft actor-critic (SAC).

FIG. 1 is a block diagram illustrating a teleoperation system 100, in accordance with some implementations. The teleoperation system 100 includes a robotic manipulator 102, one or more remote controllers (e.g., a remote operator 110-1 and a remote controller 110-2, sometimes collectively referred to herein as "the remote controllers 110"), and/or one or more data sources (e.g., network packets 106) that are transmitted between or accessed by the robotic manipulator 102 and the remote controllers 110. One or more remote servers (e.g., wired and/or wireless networks, such as network 104) may be used to communicably couple the components of the teleoperation system. In some implementations, the robotic manipulator 102 includes an appendage (e.g., a robotic arm) having a plurality of first joints, wherein a pose of the appendage and respective positions of the first joints are responsive to external/remote control signals transmitted via the network 104. In some implementations, the remote controller 110-2 is a controller with a physical user interface device 108, such as joystick assembly. In some embodiments, the user interface device 108 has a control appendage (e.g., a joystick), haptic feedback features, and/or includes (e.g., is coupled with) one or more local displays configured for viewing by the human user (e.g., the operator 110) and/or to convey the operating environment proximate to the manipulator, including the pose of the appendage, its interaction with an object, positions of the plurality of first joints, and/or a view of the physical environment around the robotic manipulator 102. The remote controller also includes a feedback receiver system to receive feedback signals transmitted by the robotic manipulator 102 and a control signal transmitter to generate the external control signals, in response to user interaction with the physical user interface device.

Figure 2:
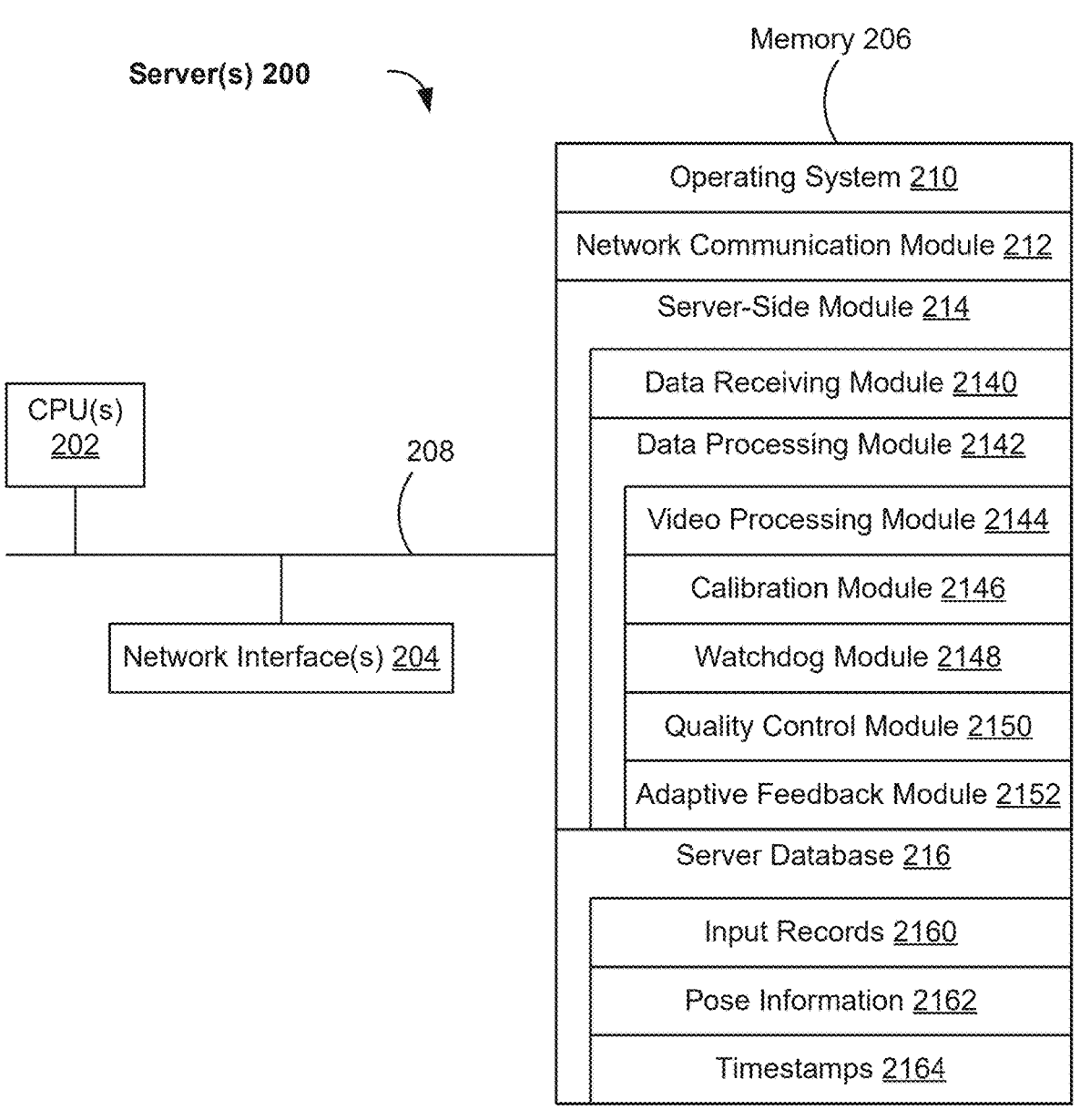
FIG. 2 is a block diagram illustrating a representative server system, in accordance with some embodiments.

FIG. 2 is a block diagram illustrating the server system 200 in accordance with some embodiments. The server system 200 (e.g., a remote server such as network 104 of FIG. 1) typically includes one or more processing units (CPUs) 202, one or more network interfaces 204 (e.g., including an I/O interface to one or more remote controllers, an I/O interface to the haptic interface, and an I/O interface to the robotic manipulator), memory 206, and one or more communication buses 208 for interconnecting these components (sometimes called a chipset. The network interface(s) 204 are configured to communicate with the communication modules. The memory 206 includes high-speed random-access memory, such as DRAM, SRAM DDR SRAM, or other random access solid state memory devices; and optionally, includes non-volatile memory such as one or more magnetic disk storage devices, one or more optical disk storage devices, one or more flash memory devices or one or more non-volatile solid state storage devices. The memory 206, optionally, includes one or more storage devices remotely locate from the one or more processing units 202. The memory, 206, alternatively the non-volatile memory within memory 206, includes a non-transitory computer readable storage medium. In some embodiments, the memory 206, or the non-transitory storage medium of the memory 206, stores the following programs, modules, and data structures or a subset or superset thereof:

an operating system 210 including procedures for handling various basic system services and for performing hardware dependent tasks;

a network communication module 212 for connecting the server system 164 to other systems and devices (e.g., client devices, electronic devices, and systems connected to one or more networks 162) via one or more network interfaces 304 (wired or wireless);

a server-side module 214, which provides server-side functionalities for device control, data processing, and data review, including, but not limited to:

a data receiving module 2140 for receiving data from electronic devices (e.g., video data from a camera) via the network 104, and preparing the received data for further processing and storage in the server database 2160;

a data processing module 3142 for processing the data provided by the remote controller or the robotic manipulator, and/or preparing and sending processed data to the remote controller, the robotic manipulator, and the user haptic interface for review, including, but not limited to:

a video processing module 2144 for processing video data received from imaging devices, including object detection, tracking, or compression;

a calibration module 2146 for adjusting system parameters based on incoming sensor or device data;

a watchdog module 2148 for monitoring the system for faults or irregular activity and initiating resets or alerts as needed;

a quality control module 2150 for validating the integrity or performance of received and processed data;

an adaptive feedback module 2152 for dynamically modifying system parameters based on user feedback or performance metrics;

a server database 216, including but not limited to:

input records 2160 for storing logs or data captured from input devices or sensors;

pose information 2162 for storing spatial position and orientation data associated with a system, user, or device;

timestamps 2164 for recording temporal information associated with input data, processed results, or system events.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 206, optionally, stores a subset of the modules and data structures identified above. Furthermore, the memory 206, optionally, stores additional modules and data structures not described above.

Figure 3A:
FIG. 3A-3B illustrates an exemplary remote controller, in accordance with some embodiments.
Figure 3A:
Figure 3B:
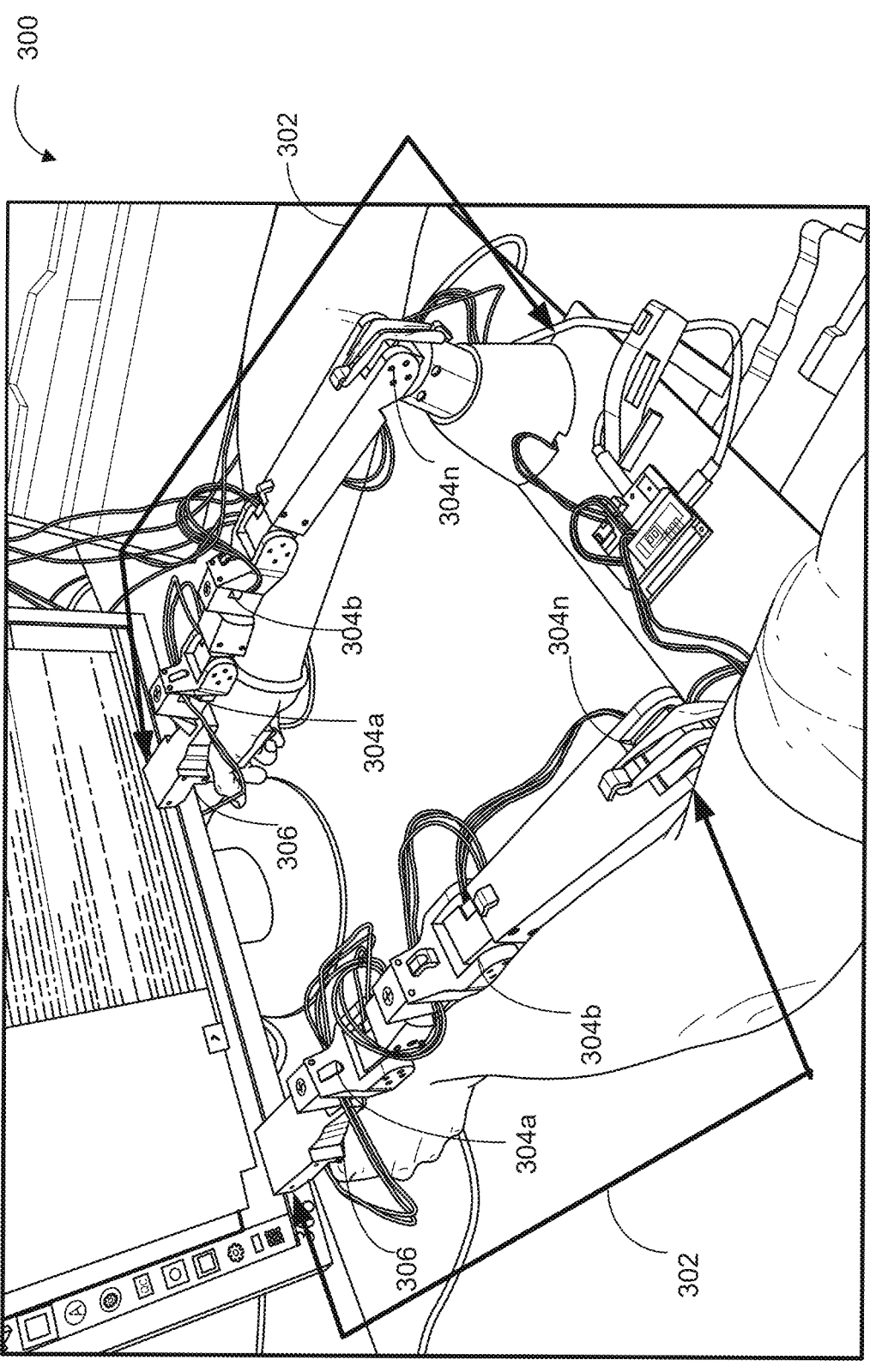

FIGS. 3A-3B illustrates an exemplary remote controller in accordance with some implementations. In some embodiments, the remote controller 300 (e.g., the robotic controller 110-2 of FIG. 1) includes one or more joysticks 302. The joystick 302 includes a joint 304a, a joint 304b, and a joint 304n (e.g., sometimes referred to herein as joints 304a-

304n) and a trigger 306. In some embodiments, the remote controller 300 is operable by a human user and configured for use remote from a robotic manipulator to generate external control signals. In some embodiments, the remote controller 300 controls the mobility of a robotic manipulator (e.g,, a forklift or crane steering system). In some embodiments, the remote controller 300 controls the operation of a robotic manipulator (e.g., a robotic arm) at a sizeable distance from the robotic manipulator. For example, the sizeable distance may be any suitable value greater than 50 m. For example, the distance can be 1 km, 10 km, or 100 km. In some embodiments, the distance can be extreme. For example, extreme distances may include distances that span across cities, countries, and/or continents.

In some embodiments, the remote controller 300 performs a calibration process while operating in a calibration mode. The calibration process enables a user (e.g., an operator) to begin teleoperation of the controller 300, with the controller 300 beginning with a same pose as a corresponding robot manipulator. In some embodiments, the joints 304a-304n include motors which provide haptic feedback and assist in moving the remote controller 300 into the same position as the robot manipulator (e.g., robotic arm). In some embodiments, the calibration process applies an algorithm which calculates a 360-degree rotation offset for each of the joints 304a-304n and/or motors of the joints 304a-304n. In some embodiments, the joints 304a-304n include the same number of joints as a number of joints on the corresponding robotic manipulator. This allows for easy (e.g., one to one) translation of movements of the joints 304a-304n of the remote controller 300 to the joints of the corresponding robotic manipulator (e.g., robotic arm).

In some embodiments, the joints 304a-304n may include a different number of joints from the number of joints on the robotic manipulator. The one or more joysticks 302 may provide encoder readings for each of the joints to be manipulated on a remote robotic manipulator directly. This enables faster means of identifying the exact joint values for the robotic manipulator as compared to traditional VR or motion capture approaches (e.g., camera live feed) which require heavy computation using computer vision algorithms to identify position and/or pose information for a robotic manipulator through video.

Figure 4:
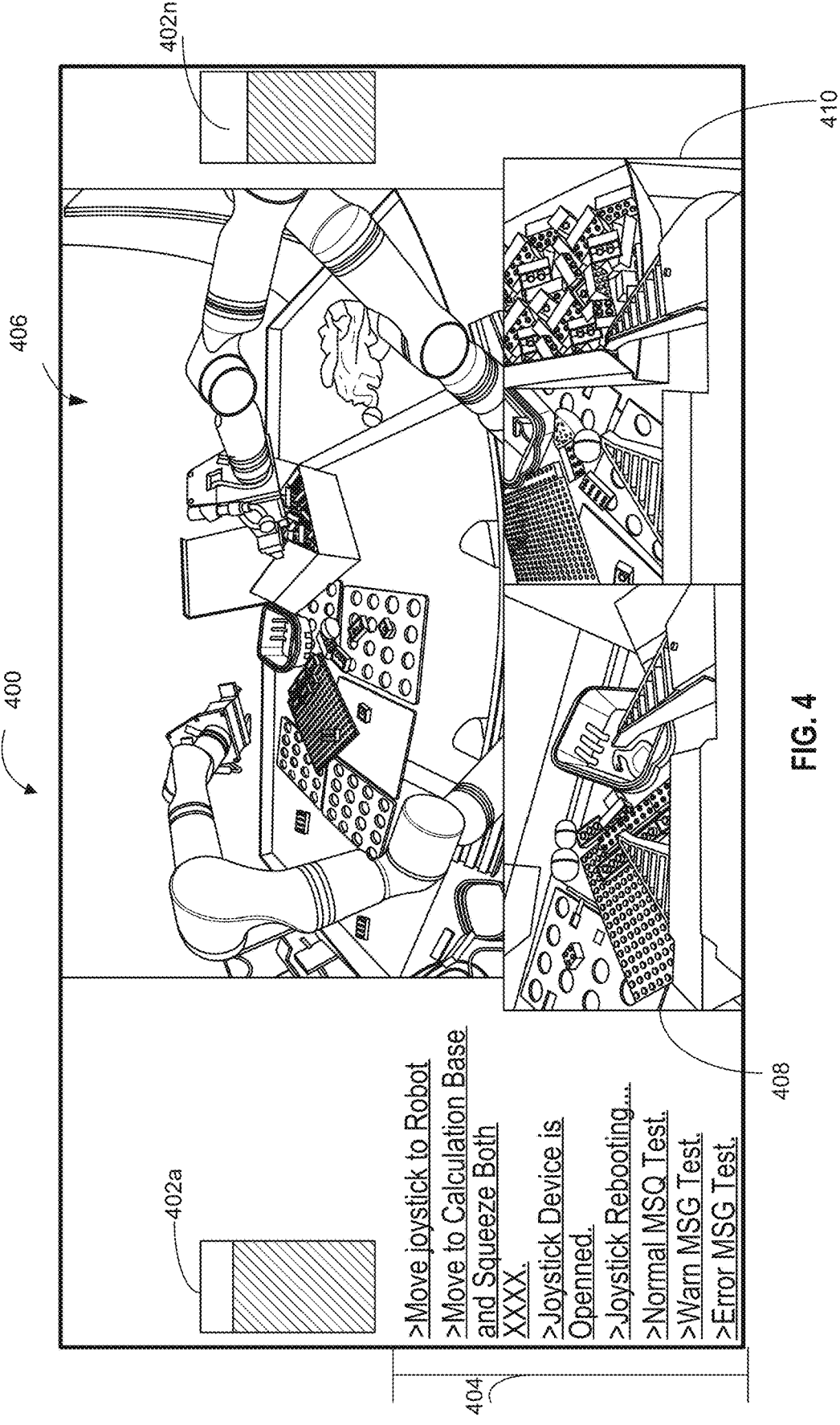
FIG. 4 is a block diagram illustrates a haptic interface in accordance with some embodiment.

FIG. 4 illustrates a haptic display interface 400 in accordance with some embodiments. In some embodiments, the haptic display interface 400 (the user interface device 108) is displayed on a computer system and other electronic computing devices. In some embodiments, haptic display interface includes calibration bars 402a and 402n (e.g., sometimes referred to herein as calibration bars 402a-402n, and describing up to n calibration bars), a message display 404, an overview feed 406, a first effector feed 408, and a second effector feed 410. In some embodiments, the haptic display interface 400 is operatively coupled to a virtual reality (VR) device (e.g., headset) and/or an augmented reality (AR) device.

In some embodiments, the number of calibration bars 402a-402n (e.g., defined by the number n) displayed on the haptic display interface 400 correspond to the number of joysticks of the remote controller 300 300 (e.g., the remote controller 110-2 as shown in FIG. 1). In some embodiments, the calibration bars 402a-402n are located at various locations on the haptic display interface 400. In some embodiments, the calibration bars 402a-402n cease to be displayed once the remote controller 300 is operating in calibration mode and the remote controller 300 and robotic manipulator are in synch.

In some embodiments, the message display 404 displays messages to the operator of the teleoperation system. The messages may include instructions, warnings, error alerts, and/or any other relevant message. The messages displayed in the message display 404 optionally appear visually different (e.g., colors, fonts, etc.,) depending on the type of message being displayed.

In some embodiments, the overview feed 406, the first effector view feed 408, and/or the third effector feed 410 display encoded data of one or more video feeds. In some embodiments, the one or more video feeds are encoded via a video compression standard (e.g., H.264). In some embodiments, a network abstraction layer (NAL) unit derived from the video compression standard is fragmented over multiple real time transport protocol (RTP) packets. In some embodiments, the packets are sent over a transfer protocol (i.e., user diagram protocol (UDP)), and as well as error correction packets. All packets are sent to the VR system, where they are decoded and displayed in the user haptic interface 400.

In some embodiments, the overview feed 406 displays every robotic appendage of the robotic manipulator (e.g., which optionally includes multiple appendages). The overview feed 406 is recorded from a viewpoint that gives an overview of the entire robotic manipulator (e.g., has a field of view wide enough to include every appendage of the robotic manipulator, including while said appendages have different poses and/or are in motion) and the action the robotic manipulator is engaging in.

In some embodiments, the first effector view feed 408, and the third effector feed 410 correspond to respective viewpoints of respective end effectors of each robotic appendage of the robotic manipulator. In some embodiments, the end effector can grab, lift, and move objects. The first effector feed 408 and the second effector feed 410 are recorded from the respective viewpoints that gives a direct visual of what object or task the respective effectors are interacting with or completing. In some embodiments, the viewpoint can be any suitable location to demonstrate a view of the end effector.

In some embodiments, the calibration process as described above with respect to FIG. 3 includes synching the remote controller 300 (e.g., the remote controller 110-2 of FIG. 1) with the robot manipulator using the haptic display interface 400 (the user interface device 108). For example, the user (e.g., the operator 110-1 of FIG. 1) of the remote controller 300 inputs external signals to the remote controller 300 (e.g., by manipulating one or more joints and/or joysticks of the remote controller 300), which cause one or more appendages of the robotic manipulator to move in accordance with the external signals. If the robotic manipulator detects that one or more appendages contacts an object during movement, the robotic manipulator transmits feedback information to the robotic controller 300. The feedback information optionally includes an encoded positioning of the joint positions of appendage of the robotic manipulator (e.g., and/or appendage) that interacted with the object, and a compliance algorithm generates a signal for this feedback information that is transmitted back through a feedback system (e.g., and when received by the robotic controller 300, causes the robotic controller 300 to generate haptic feedback). In some embodiments, the feedback signal includes instructions that visually change the calibration bars 402a-402n. The visual changes on the calibration bars 402a-402n alert assist the user operator in repositioning the joints 304a-304n of the joystick 302. In some embodiments, there is a set of calibration bars analogous to the calibration bars 402a-402n for each joystick of the one or more joysticks 302 of the remote controller 300.

In some embodiments, the system is configured to enable a jerk control protocol allows the teleoperation system to operate despite uncertain and/or unreliable network conditions (also sometimes referred to herein as a interrupt event). Interrupt events include dropped network packets, the transmittal of out of order network packets, and faulty commands (e.g., human error and/or computer error). When the system detects an interrupt event, a modified set of instructions for changing the pose and/or position of the robotic manipulator is generated in accordance with a control algorithm, wherein the control algorithm calculates an actual time interval between received signals of the robotic control signals.

In some embodiments, the control algorithm that determines the modified set of instructions for changing the pose and/or position of the robotic manipulator first receives timestamp data corresponding to each received signal of the robotic control signals. Next the algorithm determines the actual time interval between received signals of the robotic control signals based on the timestamp data and a derivative term based on the actual time interval between received signals of the robotic control signals. The algorithm further determines an integral term based on the actual time interval between received signals of the robotic control signals. Lastly, the algorithm determines the modified set of instructions for changing the pose and/or position of the robotic manipulator via a proportional-integral-derivative controller. The proportional-integral-derivative controller determines the modified set of instructions for changing the pose and/or position of the robotic manipulator based at least in part on the derivative term and the integral term.

Figure 5:
FIG. 5 an illustrative exemplary robotic manipulator in accordance with some embodiments.
Figure 5:
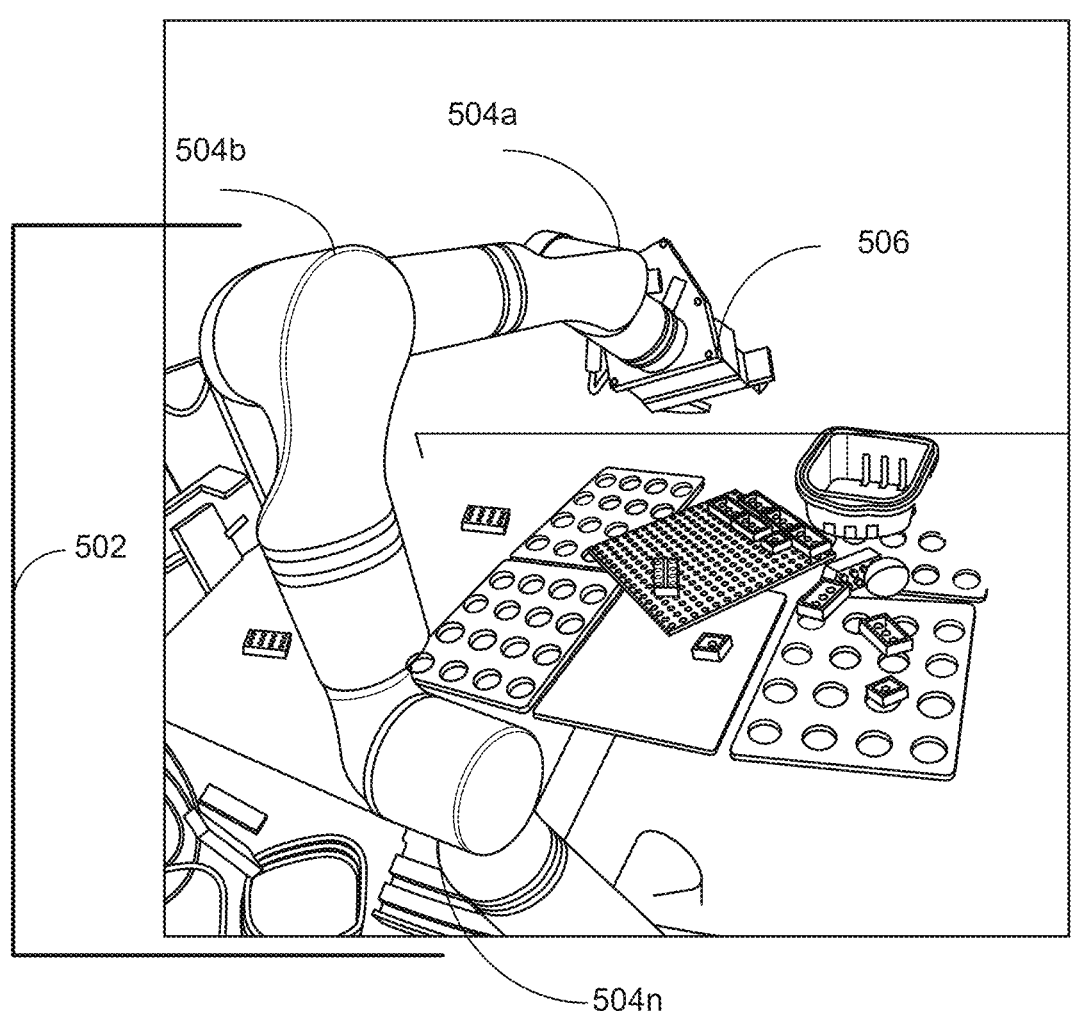

FIG. 5 illustrates an exemplary robotic manipulator 500 in accordance with some embodiments. In some embodiments, the robotic manipulator 500 (e.g., the robotic manipulator 102 in FIG. 1) includes an appendage 502, a joint 504a, a joint 504b and a joint 504n (e.g., sometimes referred to herein as joints 504a-504n), and an end effector 506.

In some embodiments, the robotic manipulator 500 includes one or more robotic appendages. FIG. 5 shows a single robotic appendage 502, but in some embodiments, the robotic manipulator 500 includes additional robotic appendages analogous to the robotic appendage 502 shown in FIG. 5. In some embodiments, the robotic appendage 502 is a robotic arm. In some embodiments, the robotic appendage 502 includes joints 504a-504n. In some embodiments, the number of joints 504a-504n that comprise the robotic appendage 502 are the same as the number of joints that comprise the remote controller 300 shown in FIGS. 3A-3B. In some embodiments, each respective join of the joints 504a-504n of the robotic manipulator 500 corresponds to a respective joint of the joints 304a-304n of the robotic controller 300. In some embodiments, a function of the end effector 506 is controlled by the trigger 306 of the robotic controller 300 (e.g., activating the trigger 306 of the robotic controller 300 causes the end effect 506 to close, grasp, or some other functions of the end effector 506).

In some embodiments, the system is configured to enable seamless switching between different teleoperators controlling a robot manipulator. In some embodiments, the seamless switching is enabled via cloud-based servers. For example, if one teleoperator's shift ends, or if a specialist's skills are needed, the system can transfer control of the robot without disruption. This ensures that the robotic manipulator is always under at least one teleoperator's supervision, and there are no location-based restrictions on where these teleoperators can be located relative to the robotic manipulator (e.g., the teleoperator need not be in the same room, the same city, the same country, or on the same continent as the robotic manipulator).

In some embodiments, the system uses multiplexing technology to manage multiple connections to the robotic system simultaneously. Each teleoperator session can be treated as a separate, and the system can switch in and out different streams (e.g., corresponding to a single robotic manipulator) without affecting the other streams (e.g., streams corresponding to different robotic manipulators and/ or different teleoperators of the different robotic manipulators). In some embodiments, this multiplexing is handled by cloud-based servers. In some embodiments, the cloud-based servers route controls signals to and from the robotic manipulator, allowing quick and efficient switching (e.g., switching in and out) between different teleoperators.

In some embodiments, the system includes failover mechanisms configured to handle potential failure states in the connect between a teleoperator and a robotic manipulator. For example, if a teleoperator's connection drops, or a critical network error occurs, the system automatically reroutes control to a standby teleoperator, or triggers a safe mode to maintain control over the robot. Such failover mechanisms ensure that the robotic manipulator is always under at least one teleoperator's control, and is not operating or moving without a teleoperator's supervision.

In some embodiments, seamless transition is achieved through state sharing and synchronization across the cloud platform (e.g., one or more cloud-based servers). Before a new teleoperator assumes control of a robotic manipulator from a previous teleoperator, the system synchronizes a current state of the robotic manipulator and its surrounding environment to the new teleoperator. In some embodiments, this synchronization includes transferring real-time data, settings, and/or operational warnings to ensure the new teleoperator has complete situational awareness from the moment the new teleoperator assumes control of the robotic manipulator.

In some embodiments, configuration files and operational parameters for the robot are stored centrally in the cloud (e.g., on one or more cloud-based servers). This allows authorized users (e.g., a teleoperator, technical support staff, and/or management) to access and modify said configuration files and/or operational parameters from almost any location (e.g., any location with sufficient infrastructure for the authorized users to connect to the cloud-based server(s)). Storing the configuration files and operational parameters centrally in the cloud also enables technical support staff to quickly retrieve and/or update operations, ensuring that the stored configuration filed are always current and correctly applied.

In some embodiments, the system uses version control mechanisms within the cloud storage to track changes made to the configuration files and/or operation parameters (e.g., stored centrally in the cloud). This provides an audit trail of which users made which changes, at what time changes were made, and what changes were made. Such audit trails enhance security and accountability, and also allow for rollbacks to previous configurations if a new configuration proves unstable and/or causes other issues.

In some embodiments, the system is configured to allow dynamic updates to the configuration files and/or operation parameters (e.g., stored centrally in the cloud). This allows teleoperators and/or automated system to adjust operational parameters in response to changing conditions or new requirements (e.g., immediately, without waiting for assistance from technical support staff), which allows the teleoperators to continue with their tasks without needing to pause operation of their corresponding robot manipulators and/or interrupt any ongoing tasks.

In some embodiments, the system includes watchdog mechanisms and feed management systems which continuously monitor robotic manipulators. These systems ensure that data feeds are running correctly and that each robotic manipulator is performing as expected. If issues are detected, the system can alert the appropriate teleoperator(s) (e.g., and/or technical support staff) and/or automatically initiate correcting measures, which helps prevent accidents and reduce operational failures.

In some embodiments, watchdog timers are used to continuously monitor the health and responsiveness of the robotic manipulators. The watchdog timers are configured to check for specific signals (or lack thereof) from the monitored robotic manipulators, to determine an operational status. If a watchdog timer for a particular robotic manipulator expires without receiving an expected signal (e.g., which indicates a possible freeze or error with respect to the particular robotic manipulator), the system automatically initiates corrective action (e.g., reboots the particular robotic manipulator, and/or alerting technical support staff).

In some embodiments, the system includes a feed management system that handles data streams coming from multiple robotic manipulators, which optionally include video data, sensor data, and/or operational logs. In some embodiments, the feed management system is cloud-based and scales dynamically (e.g., based on a number of robotic manipulators currently being operated) to manage varying data loads effectively.

In some embodiments, machine learning watchdog systems are integrated with relevant operational data streams. In some embodiments, the system collects comprehensive, timely, and high-quality data from one or more robotic manipulators and/or teleoperators, and the machine learning models have access to the collected data. In some embodiments, the system monitors multiple data points (for a particular robotic manipulator) simultaneously to provide a holistic overview of the robotic manipulator's operational health (e.g., and to ensure no significant indicators are overlooked).

In some embodiments, the system includes session management and quality control systems, which are optionally handled via cloud-based servers. In some embodiments, the session management and/or quality control systems track each teleoperation session, and monitors a duration, control inputs, and system performance. In some embodiments, the monitored information is compiled into session logs for further analysis (e.g., by a human). In some embodiments, the monitoring occurs in real-time.

In some embodiments, the system tracks each teleoperation session, and logs start and end times, teleoperator identifies, key commands issued, and any anomalies detected during the teleoperation session. In some embodiments, this tracking is facilitated by a cloud-based management system, which provides a comprehensive overview of active and historical sessions, which enables effective oversight and facilitates audits relating to teleoperation best practices.

In some embodiments, machine learning models are used to analyze incoming data streams (e.g., optionally including sensor outputs, operational logs, and/or control signals), to identify deviations from expected patterns. Examples of possible deviations include unusual movement, unexpected responses to commands, and/or irregular sensor readings. In some embodiments, once a deviation is detected, the system can trigger alerts (e.g., to affected teleoperators, and/or to technical support staff), and/or initiate corrective actions (e.g., disabling, rebooting, and/or recalibrating an affected robotic manipulator) depending on the severity and nature of the deviation.

In some embodiments, the system assess the efficiency and safety of active teleoperation system through a series of real-time checks and balances. In some embodiments, the series of real-time checks and balances includes monitoring the response time of one or more teleoperators, the accuracy of movement of one or more robotic manipulators, and/or adherence to safety protocols. In some embodiments, if the system detects deviations from a predefined standard (e.g., range of acceptable response times, accuracy of movement, and/or adherence to safety protocols), the system automatically triggers alerts to relevant users (e.g., teleoperators and/or technical support staff), and/or automatically initiates intervention measures to correct and/or mitigate the detected deviations.

In some embodiments, the system includes adaptive feedback mechanisms that adjust operational parameters based on real-time performance data. For example, if lag or jitter is detected in transmitted control signals, the system automatically adjusts data transmission rates and/or switches to a different network channel to improve connectivity. This adaptive feedback mechanisms help maintain smooth operation of robotic manipulators, regardless of external network conditions.

Figure 6:
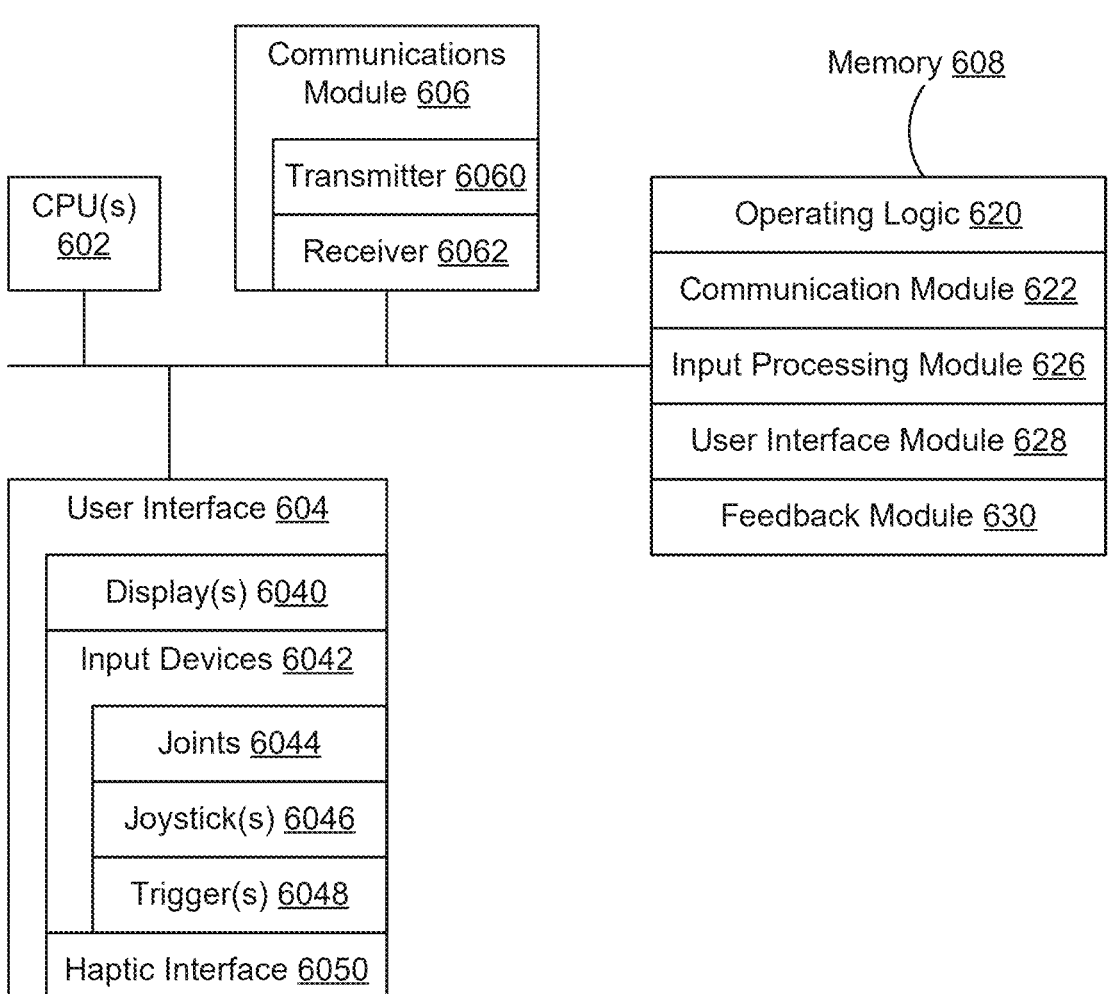
FIG. 6 is a block diagram illustrating a representative controller system, in accordance with some embodiments.

FIG. 6 is a block diagram illustrating a representative robotic controller 600 in accordance with some implementations. In some implementations, the robotic controller 600 (e.g., the remote controller 110-2 in FIG. 1) includes one or more processing units (e.g., CPUs, ASICs, FPGAs, microprocessors, and the like) 602, one or more communication interfaces, memory 608, and one or more communication buses for interconnecting these components. The communications module 606 includes a transmitter 6060 and a receiver 6062, which in some implementations enable communication between the robotic controller 600 and other devices, such as robotic manipulators, external processors, or remote user interfaces.

In some implementations, the user interface 604 includes one or more output and input devices. For example, the user interface 604 includes a display 6040 (e.g., a graphical display or LED indicator), and one or more input devices 6042 for receiving operator input. The user interface 604 can also include various physical interaction components, including joints 6044, a joystick 6046, one or more triggers 6048, and/or a haptic interface 6050 for tactile feedback. These input components allow an operator to provide control inputs to the robotic controller 600 and to receive real-time feedback from the system.

The memory 608 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 608, or alternatively the non-volatile memory within the memory 608, includes a non-transitory computer readable storage medium. In some implementations, the memory 608, or the non-transitory computer readable storage medium of the memory 608, stores the following programs, modules, and data structures, or a subset or superset thereof:

operating logic 620, including procedures for handling various basic system services and performing hardware-dependent tasks;

a communication module 622 for connecting to and exchanging data with other networked devices (e.g., robotic systems, external servers, or remote control units) via wired or wireless protocols;

an input processing module 626 for detecting and interpreting operator inputs or interactions from input devices 6042, joints 6044, joysticks 6046, and other input components;

a user interface module 628 for generating and displaying graphical interfaces and feedback via the display 6040, or for providing other feedback through the haptic interface 6050;

a feedback module 630 for monitoring and collecting feedback data such as operator response times, input signals, or movement commands, which may be used for calibration, accuracy analysis, or adaptive control of a connected robotic system.

Each of the above-identified elements may be stored in one or more of the previously mentioned memory devices and corresponds to a set of instructions for performing a function described above. The above-identified modules or programs (i.e., sets of instructions) need not be implemented as separate software programs, procedures, or modules, and various subsets of these modules may be combined or rearranged in different implementations. In some implementations, the memory 608 optionally stores a subset of the modules and data structures identified above, and may further include additional modules or data structures not shown in FIG. 6.

Figure 7:
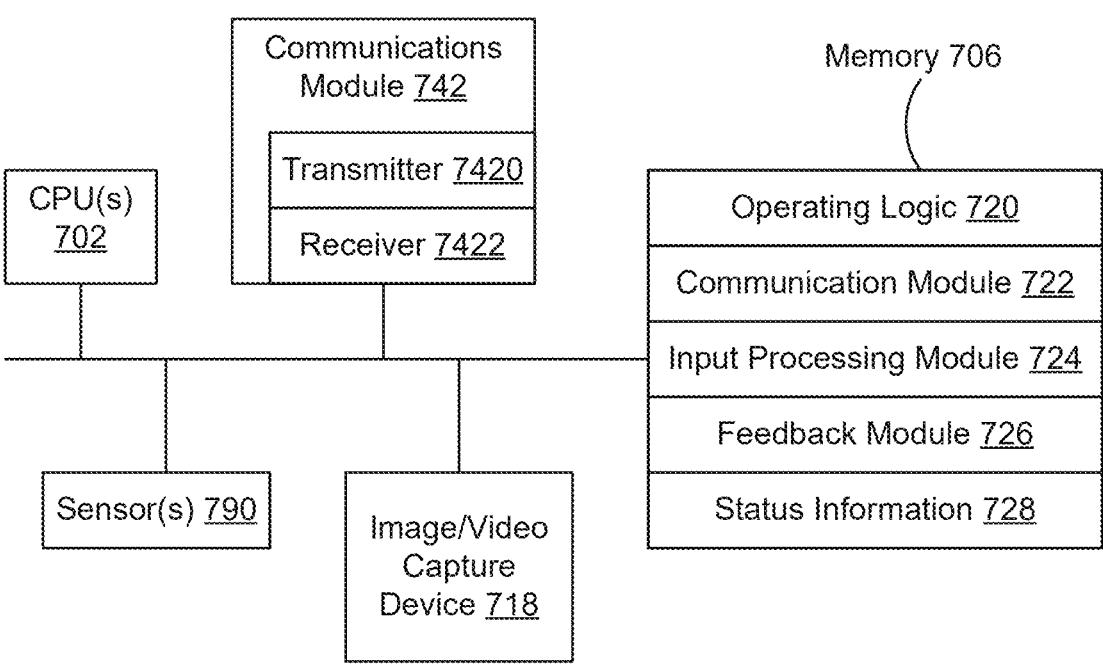
FIG. 7 is a block diagram illustrating a representative robotic manipulator system, in accordance with some embodiments.

FIG. 7 is a block diagram illustrating is a block diagram illustrating a representative robotic manipulator 600 (e.g., the robotic manipulator 102 in FIG. 1) in accordance with some implementations. In some implementations, the teleoperation robotic device includes one or more processing units (e.g., CPUs, ASICs, FPGAS, microprocessors, and the like) 702, one or more memory devices 706, a communications module 742, and a set of communication buses for interconnecting these components.

The communications module 742 includes a transmitter 7420 and a receiver 7422, which together facilitate two-way communication with remote operator devices or centralized control systems. This bidirectional link enables real-time command reception and feedback transmission necessary for responsive robotic teleoperation.

The system further includes one or more sensors 790, which may comprise motion sensors, force sensors, gyroscopes, accelerometers, or other components for detecting position, orientation, or environmental parameters of the robotic manipulator. These sensors enable the device to perceive and react to physical conditions, which is essential for safe and effective remote operation.

In some implementations, an image/video capture device 718 (e.g., a camera or visual sensor array) captures visual information of the environment, which is transmitted to the remote operator to facilitate visual guidance, situational awareness, or augmented control.

The memory 706 includes high-speed volatile memory (e.g., DRAM, SRAM, DDR RAM) and optionally non-volatile memory (e.g., flash memory, magnetic disk, solid-state storage). The memory 706, or alternatively its non-volatile portion, includes a non-transitory computer-readable storage medium. In some implementations, the memory 706 stores the following programs, modules, and data structures, or subsets/supersets thereof:

operating logic 720, which manages system-level tasks such as boot processes, scheduling, and low-level coordination of robotic components;

communication module 722, which coordinates data exchange between the robotic device and external control systems via wired or wireless protocols (e.g., Wi-Fi, 5G, or proprietary industrial networks);

input processing module 724, which receives and interprets command inputs, such as movement instructions, manipulator control signals, or environmental feedback from sensors 790;

feedback module 726, which generates return signals, such as position status, resistance detection, or sensor values, and transmits them back to the operator system to close the control loop;

status information 728, which logs and evaluates the hardware and software health of the robotic system, allowing detection of malfunctions or irregularities. This module is particularly relevant for determining whether the robotic manipulator has experienced hardware-related errors, enabling autonomous safety responses or maintenance alerts.

Each of the above-identified modules may be stored within one or more physical memory devices and may correspond to software instructions for executing the described functionality. The modules need not be separate or exclusive; combinations and variations may be implemented across different remote teleoperation system architectures. Additionally, memory 706 may include other modules and data structures not explicitly shown or discussed.

FIG. 8 is a flow diagram illustrating an exemplary method 800 performed on a teleoperation system (e.g., a remote controller 110-2, the user interface device 108, and robotic manipulator 102 of FIG. 1) in accordance with some embodiments. In some embodiments, method 800 correspond to instructions stored in a computer memory or computer readable storage medium (e.g., memory 506, 606, or 706). Some operations in method 8000 are, optionally, combined and/or the order of some operations is, optionally, changed.

At a robotic controller (802) (e.g., a joystick controller), receive a plurality of user inputs (804). In some embodiments, the robotic controller translates the plurality of user inputs (806) to a plurality of robotic control signals. In some embodiments, the robotic controller transmits the plurality of robotic control signals (808) from the robotic controller to a robotic manipulator that is configured to operate separately from the robotic controller, wherein the plurality of robotic control signals, when received by the robotic manipulator, cause the manipulator to move a plurality of first joints and an end effector of the robotic manipulator in accordance with the received plurality of robotic control signals. Translating the plurality of user inputs to a plurality of robotic signals allows for quicker communication between an input at the controller and the response movement from the robotic manipulator. In some embodiments, the robotic controller receives, from a feedback system operatively coupled to the robotic manipulator, feedback information (810) that includes a current pose of the robotic manipulator and includes a current configuration of the plurality of first joints. Receiving feedback information that includes a current pose of the robotic manipulator and includes a current configuration of the plurality of first joints FIG. 9 is a flow diagram illustrating an exemplary method 900 performed on a teleoperation system (e.g., a remote controller 110-2, the user interface device 108, and robotic manipulator 102 of FIG. 1) in accordance with some embodiments. In some embodiments, method 900 corresponds to instructions stored in a computer memory or computer readable storage medium (e.g., memory 506, 606, or 706). Some operations in method 900 are, optionally, combined and/or the order of some operations is, optionally, changed.

At a robotic controller that includes a plurality of first joints 902, the plurality of first joints corresponding to a plurality of second joints of a robotic manipulator that is in communication with the robotic controller, receive a plurality of user inputs (904) manipulating the plurality of first joints of the robotic controller while the robotic controller is operating in a calibration mode. Transmit controller pose information (906) to a robotic manipulator in communication with the robotic controller, wherein the controller pose information is based on a current pose of the plurality of first joints of the robotic controller in response to receiving the plurality of user inputs manipulating the plurality of first joints of the robotic controller. Receive feedback information (908) from the robotic controller, wherein the feedback information includes information corresponding to a pose of the plurality of second joints of the robotic manipulator. Generate haptic feedback (9010) based on an amount by which the current pose of the plurality of first joints differs from the pose of the plurality of second joints of the robotic manipulator in accordance with a determination that the current pose of the plurality of first joints is different than the pose of the plurality of second joints of the robotic manipulator. Switch the robotic controller to operate in a control mode (912) in accordance with a determination that the current pose of the plurality of first joints is the same as the pose of the plurality of second joints of the robotic manipulator.

FIG. 10 is a flow diagram illustrating an exemplary method 1000 performed on a teleoperation system (e.g., a remote controller 110-2, the user interface device 108, and robotic manipulator 102 of FIG. 1) in accordance with some embodiments. In some embodiments, method 1000 corresponds to instructions stored in a computer memory or computer readable storage medium (e.g., memory 506, 606, or 706). Some operations in method 1000 are, optionally, combined and/or the order of some operations is, optionally, changed.

Transmit, via a device comprising a processor, a plurality of robotic signals (1002). Receive, at a robotic manipulator, the plurality of robotic control signals (1004). Change a pose and/or position of the robotic manipulator in accordance with the robotic control signals (1006). Detect an interrupt event while changing the pose and/or position of the robotic manipulator in accordance with the robotic control signals (1008). Determine a modified set of instructions for changing the pose and/or position of the robotic manipulator (1010) in accordance with a control algorithm, wherein the control algorithm calculates an actual time interval between received signals of the robotic control signals in response to detecting the interrupt event.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Turning now to some example embodiments of the methods, devices, systems, and computer-readable storage media described earlier.

(A1) In one aspect some embodiments include a teleoperation system (e.g., the teleoperation system 100). The system includes: (i) a robotic controller configured to translate a plurality of user inputs to a plurality of robotic control signals; (ii) a robotic manipulator, configured to operate separately from the robotic controller and to receive robotic control signals from the robotic controller, the robotic manipulator comprising a plurality of first joints and an end effector, wherein the robotic manipulator is configured to assume a plurality of poses, and wherein each respective pose of the plurality of poses corresponds to a respective configuration of the plurality of first joints; and (iii) a feedback system, operatively coupled to the robotic manipulator, the feedback system configured to generate feedback information and transmit the feedback information to the robotic controller, wherein the feedback information includes information that indicates a current pose of the robotic manipulator, including the respective configuration of the plurality of first joints corresponding to the current pose of the robotic manipulator (A2) In some embodiments of A1, the robotic controller includes one or more joysticks, a plurality of second joints, and one or more triggers.

(A3) In some embodiments of A1-A2, the number of joints in the plurality of first joints is the same as a number of joints in the plurality of second joints.

(A4) In some embodiments of A1-A3, the joints of the plurality of first joints are connected in a first manner, and the joints of the plurality of second joints are connected in the first manner.

(A5) In some embodiments of A1-A4, a haptic interface is operatively coupled to the robotic controller and is configured to generate haptic feedback in accordance with the feedback information.

(A6) In some embodiments of A1-A5, the robotic manipulator has a plurality of degrees of freedom.

(A7) The robotic manipulator is located at least 50 meters from the robotic controller.

(B1) In another aspect, some embodiments include a method (e.g., the method 800). In some embodiments, the method is performed at a teleoperation system (e.g., 100). The method includes: (i) at a robotic controller: (ii) receiving a plurality of user inputs; (iii) translating the plurality of user inputs to a plurality of robotic control signals; (iv) transmitting the plurality of robotic control signals from the robotic controller to a robotic manipulator that is configured to operate separately from the robotic controller, wherein the plurality of robotic control signals, when received by the robotic manipulator, cause the manipulator to move a plurality of first joints and an end effector of the robotic manipulator in accordance with the received plurality of robotic control signals; (v) receiving, from a feedback system operatively coupled to the robotic manipulator, feedback information that includes a current pose of the robotic manipulator and includes a current configuration of the plurality of first joints.

(B2) In some embodiments of A1, the method further includes one or more joysticks, a plurality of second joints, and one or more triggers.

(B3) In some embodiments of A1-A2, the number of joints in the plurality of first joints is the same as a number of joints in the plurality of second joints.

(B4) In some embodiments of A1-A3, the joints of the plurality of first joints are connected in a first manner, and the joints of the plurality of second joints are connected in the first manner.

(B5) In some embodiments of A1-A4, a haptic interface is operatively coupled to the robotic controller and is configured to generate haptic feedback in accordance with the feedback information.

(B6) In some embodiments of A1-A5, the robotic manipulator has a plurality of degrees of freedom.

(B7) The robotic manipulator is located at least 50 meters from the robotic controller.

(C1) In another aspect, some embodiments include a method (e.g., the method 900). In some embodiments, the method is performed at a teleoperation system (e.g., 100). The method includes: (i) at a robotic controller that includes a plurality of first joints, the plurality of first joints corresponding to a plurality of second joints of a robotic manipulator that is in communication with the robotic controller: (ii) while the robotic controller is operating in a calibration mode, receiving a plurality of user inputs manipulating the plurality of first joints of the robotic controller; (iii) in response to receiving the plurality of user inputs manipulating the plurality of first joints of the robotic controller, transmitting controller pose information to a robotic manipulator in communication with the robotic controller, wherein the controller pose information is based on a current pose of the plurality of first joints of the robotic controller; (iv) receiving feedback information from the robotic controller, wherein the feedback information includes information corresponding to a pose of the plurality of second joints of the robotic manipulator; (iv) in accordance with a determination that the current pose of the plurality of first joints is different than the pose of the plurality of second joints of the robotic manipulator, generating haptic feedback based on an amount by which the current pose of the plurality of first joints differs from the pose of the plurality of second joints of the robotic manipulator; and (iv) in accordance with a determination that the current pose of the plurality of first joints is the same as the pose of the plurality of second joints of the robotic manipulator, switching the robotic controller to operate in a control mode.

(C2) In some embodiments of B1, the method includes while the robotic controller is operating in the control mode, (i) receiving a user input; (ii) in response to receiving the user input, translating the user input to a robotic control signal; (iii) transmitting the robotic control signal to the robotic manipulator, wherein the robotic control signal, when received by the robotic manipulator, causes the robotic manipulator to change a pose and/or position of the robotic manipulator.

(D1) In another aspect, some embodiments include a method (e.g., the method 1000). In some embodiments, the method is performed at a teleoperation system (e.g., system 100). In some embodiments, the method includes (i) transmitting, via a device comprising a processor, a plurality of robotic signals; (ii) receiving, at a robotic manipulator, the plurality of robotic control signals; (iii) changing a pose and/or position of the robotic manipulator in accordance with the robotic control signals; (iv) while changing the pose and/or position of the robotic manipulator in accordance with the robotic control signals, detecting an interrupt event; (v) in response to detecting the interrupt event, determining a modified set of instructions for changing the pose and/or position of the robotic manipulator in accordance with a control algorithm, wherein the control algorithm calculates an actual time interval between received signals of the robotic control signals.

(D2) In some embodiments of C1, the control algorithm determines the modified set of instructions for changing the pose and/or position of the robotic manipulator by: (i) receiving timestamp data corresponding to each received signal of the robotic control signals; (ii) determining the actual time interval between received signals of the robotic control signals based on the timestamp data; (iii) determining a derivative term based on the actual time interval between received signals of the robotic control signals; (iv) determining an integral term based on the actual time interval between received signals of the robotic control signals; and (v) determining the modified set of instructions for changing the pose and/or position of the robotic manipulator via a proportional-integral-derivative controller, wherein the proportional-integral-derivative controller determines the modified set of instructions for changing the pose and/or position of the robotic manipulator based at least in part on the derivative term and the integral term.

(D3) In some embodiments of D1-D2, the method further includes (i) the proportional-integral-derivative controller determines the modified set of instructions for changing the pose and/or position of the robotic manipulator based at least in part on a jerk term; and (ii) the jerk term is a difference in acceleration over time, determined based on the actual time interval between received signals of the robotic control signals.

(D4) In some embodiments of D1-D3, the method further includes the interrupt event is an unstable network condition.

(D5) In some embodiments of D1-D4, the method further includes one or more network packets are dropped as result of the unstable network condition.

(D6) In some embodiments of D1-D5, the method further includes determining the modified set of instructions for changing the pose and/or position of the robotic manipulator in accordance with the control algorithm includes applying a filtering technique to inputs of the control algorithm.

(D7) In some embodiments of D1-D6, the method further includes the filtering technique comprises applying a Savitzky-Golay filter.

(E1) In another aspect, some embodiments include a non-transitory, computer-readable storage medium including instructions that, when executed by a computing system, cause the computing system to perform or cause performance of the method of any of B1-B7, C1-C2 and D1-D7.

(E2) In another aspect, some embodiments include a computing system comprising: one or more processors; and memory comprising instructions, which when performed at the one or more processors, cause execution of the method of any of C1-C2 and D1-D7.

The foregoing description, for purpose of explanation, has been described with reference to specific embodiments. However, the illustrative discussions above are not intended to be exhaustive or to limit the scope of the claims to the precise forms disclosed. M any modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a robotic controller:
   receiving a plurality of user inputs;
   translating the plurality of user inputs to a plurality of robotic control signals;
   transmitting the plurality of robotic control signals from the robotic controller to a robotic manipulator that is configured to operate separately from the robotic controller, wherein the plurality of robotic control signals, when received by the robotic manipulator, causes the robotic manipulator to move a plurality of first joints and an end effector of the robotic manipulator in accordance with the plurality of robotic control signals; and
   receiving, from a feedback system, operatively coupled to the robotic manipulator, feedback information comprising a current pose of the robotic manipulator and a current configuration of the plurality of first joints,
   wherein the robotic controller comprises one or more joysticks, a plurality of second joints, and one or more triggers.

2. The method claim 1, wherein a number of joints in the plurality of first joints is same as a number of joints in the plurality of second joints.

3. The method of claim 2, wherein the joints of the plurality of first joints are connected in a first manner, and the joints of the plurality of second joints are connected in the first manner.

4. The method of claim 1, wherein the robotic controller is operatively coupled to a haptic interface that is configured to generate haptic feedback in accordance with the feedback information.

5. The method of claim 1, wherein the robotic manipulator is located at least 50 meters from the robotic controller.

6. A teleoperation system, comprising:
   a robotic controller comprising one or more joysticks, a plurality of second joints, and one or more triggers and configured to translate a plurality of user inputs to a plurality of robotic control signals;
   a robotic manipulator, configured to operate separately from the robotic controller and to receive robotic control signals from the robotic controller, the robotic manipulator comprising a plurality of first joints and an end effector,
   wherein the robotic manipulator is configured to assume a plurality of poses, and
   wherein each respective pose of the plurality of poses corresponds to a respective configuration of the plurality of first joints; and
   a feedback system, operatively coupled to the robotic manipulator, the feedback system configured to generate feedback information and transmit the feedback information to the robotic controller,
   wherein the feedback information includes information that indicates a current pose of the robotic manipulator, including the respective configuration of the plurality of first joints corresponding to the current pose of the robotic manipulator.

7. The teleoperation system of claim 6, wherein a number of joints in the plurality of first joints is same as a number of joints in the plurality of second joints.

8. The teleoperation system of claim 6, wherein joints of the plurality of first joints are connected in a first manner, and joints of the plurality of second joints are connected in the first manner.

9. The teleoperation system of claim 6, further comprising a haptic interface, operatively coupled to the robotic controller and configured to generate haptic feedback in accordance with the feedback information.

10. The teleoperation system of claim 9, wherein the haptic interface is a haptic display interface comprising one or more of a set of calibration bars, a message display, an overview feed, and an end effector feed.

11. The teleoperation system of claim 10, wherein a number of calibration bars in the set of calibration bars corresponds to a number of the one or more joysticks.

12. The teleoperation system of claim 9, wherein the haptic interface is operatively coupled to a virtual reality (VR) device or an augmented reality (AR) device.

13. The teleoperation system of claim 6, wherein the robotic manipulator has a plurality of degrees of freedom.

14. The teleoperation system of claim 6, wherein the robotic manipulator is located at least 50 meters from the robotic controller.

15. The teleoperation system of claim 6, wherein the robotic controller comprises one or more local displays configured for viewing an operating environment proximate to the robotic manipulator, such as a current pose of the plurality of poses, interaction of the robotic manipulator with an object, and a current position of the plurality of first joints.

16. The teleoperation system of claim 6, wherein the plurality of second joints of the robotic controller comprises motors for providing haptic feedback and assisting in moving the robotic controller into a same position as the robotic manipulator.

17. The teleoperation system of claim 6, wherein the robotic controller is configured to calibrate by calculating a 360-degree rotation offset for each of the plurality of second joints.

18. The teleoperation system of claim 6, wherein the one or more joysticks are configured to provide encoder readings for one or more of the plurality of first joints of the robotic manipulator to be manipulated.

19. A method comprising:

at a robotic controller comprising a plurality of first joints corresponding to a plurality of second joints of a robotic manipulator that is in communication with the robotic controller:

while the robotic controller is operating in a calibration mode, receiving a plurality of user inputs manipulating the plurality of first joints of the robotic controller;

in response to receiving the plurality of user inputs manipulating the plurality of first joints of the robotic controller, transmitting controller pose information to a robotic manipulator in communication with the robotic controller, wherein the controller pose information is based on a current pose of the plurality of first joints of the robotic controller;

receiving feedback information from the robotic controller, wherein the feedback information includes information corresponding to a pose of the plurality of second joints of the robotic manipulator;

in accordance with a determination that the current pose of the plurality of first joints is different than the pose of the plurality of second joints of the robotic manipulator, generating haptic feedback based on an amount by which the current pose of the plurality of first joints differs from the pose of the plurality of second joints of the robotic manipulator; and in accordance with a determination that the current pose of the plurality of first joints is same as the pose of the plurality of second joints of the robotic manipulator, switching the robotic controller to operate in a control mode.

20. The method of claim 19, further comprising while the robotic controller is operating in the control mode, receiving a user input; in response to receiving the user input, translating the user input to a robotic control signal; and transmitting the robotic control signal to the robotic manipulator, wherein the robotic control signal, when received by the robotic manipulator, causes the robotic manipulator to change a pose and/or position of the robotic manipulator.

* * * * *